US011866973B2

(12) United States Patent
Meusburger et al.

(10) Patent No.: US 11,866,973 B2
(45) Date of Patent: Jan. 9, 2024

(54) ARRANGEMENT FOR GUIDING A SLIDING DOOR OR FOLDING-SLIDING DOOR ON A FURNITURE WALL

(71) Applicant: Julius Blum GmbH, Hoechst (AT)

(72) Inventors: Marc Meusburger, Egg (AT); Markus Irgang, Altach (AT)

(73) Assignee: Julius Blum GmbH, Hoechst (AT)

( * ) Notice: Subject to any disclaimer, the term of this patent is extended or adjusted under 35 U.S.C. 154(b) by 204 days.

(21) Appl. No.: 17/563,688

(22) Filed: Dec. 28, 2021

(65) Prior Publication Data

US 2022/0120127 A1 Apr. 21, 2022

Related U.S. Application Data

(63) Continuation of application No. PCT/AT2020/060257, filed on Jun. 29, 2020.

(30) Foreign Application Priority Data

Jul. 8, 2019 (AT) .............................. A 50618/2019
Dec. 19, 2019 (AT) .............................. A 51117/2019

(51) Int. Cl.
*E05D 15/00* (2006.01)
*E05D 15/14* (2006.01)
*E05D 15/58* (2006.01)

(52) U.S. Cl.
CPC ............. *E05D 15/14* (2013.01); *E05D 15/58* (2013.01); *E05Y 2201/602* (2013.01);
(Continued)

(58) Field of Classification Search
CPC ....... E05D 15/14; E05D 15/58; E05D 15/264; E05D 15/34; E05D 15/28; E05D 15/30;
(Continued)

(56) References Cited

U.S. PATENT DOCUMENTS 485,934 A * 11/1892 Hess ........................ E05D 15/14 49/353
2,214,229 A * 9/1940 Frasch .................. E05D 15/463 16/400
(Continued)

FOREIGN PATENT DOCUMENTS

AT 303 998 12/1972
CA 2 119 728 9/1994
(Continued)

OTHER PUBLICATIONS

International Search Report dated Sep. 30, 2020 in International (PCT) Application No. PCT/AT2020/060257.

*Primary Examiner* — Chuck Y Mah
(74) *Attorney, Agent, or Firm* — Wenderoth, Lind & Ponack, L.L.P.

(57) ABSTRACT

An arrangement includes a first guide system and a second guide system at a vertical distance from the first guide system. The two guide systems each has a guide and a guide body mounted to be displaceable on the guide, a carrier on which a door is to be fastened and which can be connected to the two guide bodies of the guide systems, and a compensation device by which a tilt moment of the carrier, or of the door arranged thereon, about a tilt axis is compensated for by a restoring moment. The compensation device includes a cable pull device and a pivot lever mechanism. The pivot lever mechanism comprises at least two pivot levers connected to one another in an articulated manner and pivotable relative to one another during a movement of the carrier by the two guide systems along the furniture wall.

18 Claims, 15 Drawing Sheets

Figure 1:
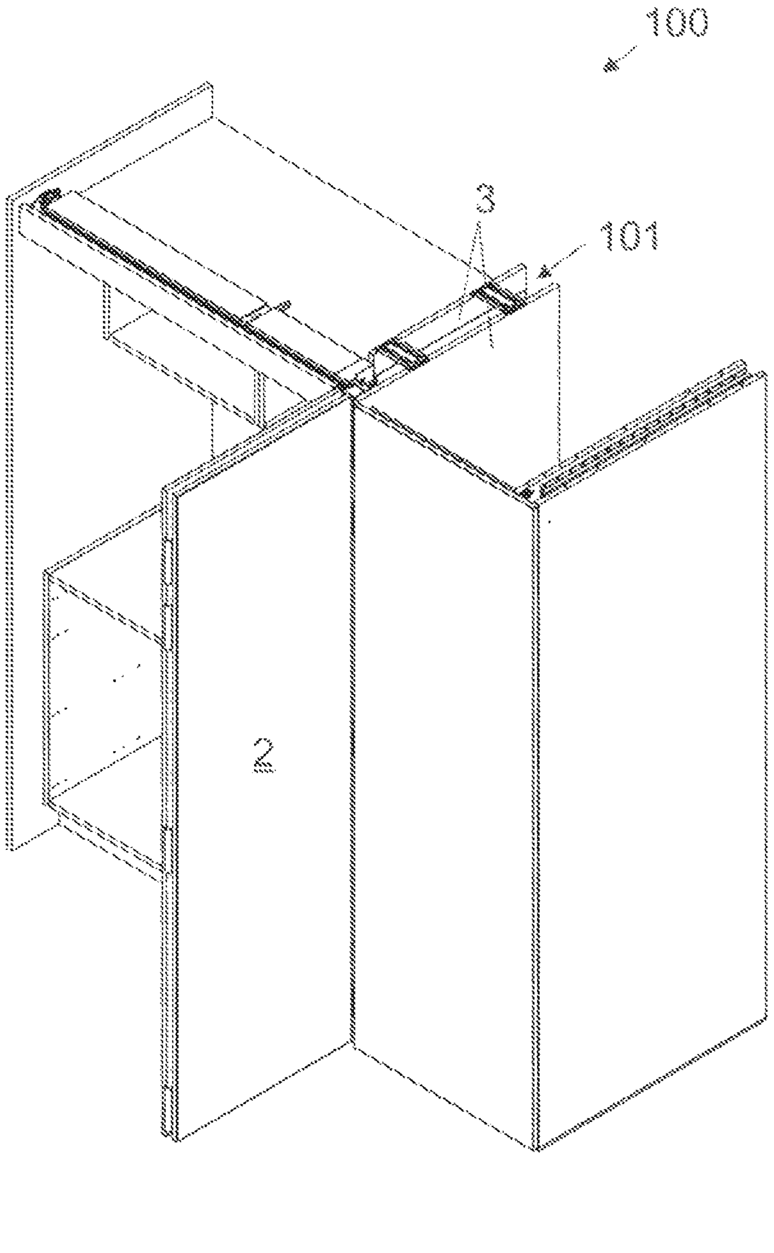

(52) U.S. Cl.
CPC ..... *E05Y 2201/62* (2013.01); *E05Y 2201/626* (2013.01); *E05Y 2201/654* (2013.01); *E05Y 2900/212* (2013.01)

(58) Field of Classification Search
CPC .. E05D 15/32; E05D 3/06; E05D 3/08; E05D 3/14; E05D 3/16; E05D 2003/166; E06B 7/36; E06B 7/367; E05Y 2900/20; E05Y 2900/212; E05Y 2003/166; E05Y 2201/62; E05Y 2201/602; E05Y 2201/626; E05Y 2201/654
See application file for complete search history.

(56) References Cited

U.S. PATENT DOCUMENTS

| | | | | |
|---|---|---|---|---|
| 3,024,838 | A * | 3/1962 | Egleston | E06B 3/01 292/201 |
| 4,468,887 | A | 9/1984 | Koch | |
| 4,672,772 | A * | 6/1987 | Nakamura | E05D 15/30 49/334 |
| 4,976,502 | A * | 12/1990 | Kelley | A47B 87/007 312/331 |
| 5,050,344 | A * | 9/1991 | Skeem | E05F 1/066 49/245 |
| 5,282,336 | A * | 2/1994 | Tucker | E05F 13/02 292/180 |
| 5,395,165 | A | 3/1995 | Woerner | |
| 6,655,090 | B2 * | 12/2003 | Regner | E06B 11/04 49/386 |
| 6,935,000 | B1 * | 8/2005 | Arnaud | E06B 11/04 16/DIG. 7 |
| 8,499,816 | B2 | 8/2013 | Taddei | |
| 9,388,631 | B2 | 7/2016 | Woeltjen, Jr. | |
| 9,470,028 | B2 | 10/2016 | Header et al. | |
| 9,637,961 | B2 | 5/2017 | Header et al. | |
| 9,894,996 | B1 | 2/2018 | Grela et al. | |
| 10,145,158 | B2 | 12/2018 | Grela et al. | |
| 11,274,482 | B2 | 3/2022 | Rupp et al. | |
| 2004/0046488 | A1 * | 3/2004 | Hogan | E06B 3/5045 312/322 |
| 2004/0100170 | A1 * | 5/2004 | Brown | E05D 15/58 312/322 |
| 2010/0314980 | A1 * | 12/2010 | Hoffman | E05D 15/58 312/322 |
| 2012/0222825 | A1 | 9/2012 | Taddei | |
| 2014/0325912 | A1 | 11/2014 | Header et al. | |
| 2014/0373449 | A1 | 12/2014 | Woeltjen, Jr. | |
| 2016/0251886 | A1 | 9/2016 | Header et al. | |
| 2018/0125236 | A1 | 5/2018 | Grela et al. | |
| 2019/0284859 | A1 | 9/2019 | Rupp et al. | |
| 2019/0330898 | A1 | 10/2019 | Rupp et al. | |

FOREIGN PATENT DOCUMENTS

| | | | | |
|---|---|---|---|---|
| CH | 531 631 | | 12/1972 | |
| CN | 101298824 | | 11/2008 | |
| CN | 103477012 | | 12/2013 | |
| CN | 106193917 | | 12/2016 | |
| CN | 108756561 | | 11/2018 | |
| DE | 177093 | | 6/1905 | |
| DE | 933 584 | | 9/1955 | |
| DE | 27 02 996 | | 8/1977 | |
| DE | 28 47 578 | | 5/1980 | |
| DE | 3037851 | | 5/1982 | |
| DE | 102016101563 | A1 * | 8/2017 | A47B 96/20 |
| FR | 2 456 822 | | 12/1980 | |
| JP | 57-20490 | | 7/1980 | |
| JP | 57-77495 | | 10/1980 | |
| JP | 60-141377 | | 9/1985 | |
| JP | 64-83790 | | 3/1989 | |
| JP | 10-280792 | | 10/1998 | |
| TW | 201623769 | | 7/2016 | |
| WO | 2018/129568 | | 7/2018 | |
| WO | 2018/129572 | | 7/2018 | |
| WO | WO-2018204948 | A1 * | 11/2018 | E05D 15/264 |
| WO | 2022/082234 | | 4/2022 | |
| WO | 2022/126162 | | 6/2022 | |

* cited by examiner

ARRANGEMENT FOR GUIDING A SLIDING DOOR OR FOLDING-SLIDING DOOR ON A FURNITURE WALL

BACKGROUND OF THE INVENTION

The invention concerns an arrangement for guiding a sliding door or folding-sliding door on a furniture wall. The invention further concerns an article of furniture comprising such an arrangement and a method of mounting such an arrangement to a furniture wall.

Arrangements as noted above are known, for example, from WO 2018/129568 A1 to the present applicant. In principle, the challenge in regard to guiding a sliding door or folding-sliding door on a furniture wall is that, because of its weight, the sliding door or folding-sliding door tends to tilt, which subsequently leads to jamming of the door between the vertically mutually spaced guides of the guide system and thus makes displacement of the door impossible or at least substantially more difficult.

WO 2018/129568 A1 proposes for resolving that problem that a cable pulling device includes at least two mutually separate pulling cables. A first of those two pulling cables is arranged between the guide body of the first guide system and at least an end of the guide of the first guide system and is arranged in non-connected relationship with respect to the second guide system, and a second of those two pulling cables is arranged between the guide body of the second guide system and at least an end of the guide of the second guide system and is in non-connected relationship with respect to the first guide system. In that case, those two pulling cables are coupled by a synchronization device.

A disadvantage with such a structure according to the state of the art, however, is that the construction of such a cable pulling device is complicated and expensive. Fitment of such a cable pulling device, in particular the synchronization device which is in the form of a synchronization bar, is a difficult procedure by virtue of the necessary manufacturing tolerances. A further disadvantage is that such a cable pulling device and in particular the winding devices on or in the carrier take up a comparatively large amount of structural space.

SUMMARY OF THE INVENTION

The object of the present invention is to avoid the described disadvantages in the state of the art and to provide an arrangement, that is improved over the state of the art, for guiding a sliding door or folding-sliding door on a furniture wall, an article of furniture comprising at least one such arrangement and a method of mounting such an arrangement to a furniture wall.

In an arrangement according to the invention for guiding a sliding door or folding-sliding door on a furniture wall it is accordingly provided that the compensation device in addition to the at least one cable pulling device has at least one pivotal lever mechanism. The at least one pivotal lever mechanism includes at least two hingedly interconnected pivotal levers which are pivotable relative to each other upon a movement of the carrier by the two guide systems along the furniture wall.

That provides an arrangement for guiding a sliding door or folding-sliding door with rigidity and stability that is improved over the state of the art. By virtue of the modified cable guidance configuration of a pulling cable of a cable pulling device an arrangement according to the invention also requires less structural space in comparison with an arrangement known from the state of the art. That reduces both the complexity and the space requirement as well as the manufacturing costs of an arrangement according to the invention over arrangements from the state of the art.

In regard to a method of mounting an arrangement according to the invention it is provided that in a first method step the first guide system or the second guide system is fixed to the furniture wall, in a second method step the other guide system is fixed to the furniture wall at a vertical spacing relative to the guide system fixed to the furniture wall in the course of the first method step, in a third method step the carrier is connected in motionally coupled relationship to the two guide bodies of the guide systems, and in a fourth method step at least one of the at least two pivotal levers is connected to one of the two guide systems and/or to the furniture wall.

There is further provided an article of furniture according to the invention comprising at least one furniture wall, at least one sliding door or folding-sliding door and at least one arrangement for guiding the at least one sliding door or folding-sliding door at the at least one furniture wall, preferably wherein the at least one furniture wall at least partially defines a shaft-shaped hollow space in the article of furniture, in which the at least one sliding door or folding-sliding door can be arranged.

The at least one pivotal level mechanism can be pivoted between a parallel position in which the at least two pivotal levers are arranged substantially parallel to each other and at least one spread position in which the at least two pivotal levers include an angle greater than 0° relative to each other, preferably wherein the at least two pivotal levers in the at least one spread position form substantially a Y-shape.

Such a Y-shaped arrangement of the pivotal levers in conjunction with a cable pulling device results in improved rigidity of the arrangement in comparison with arrangements from the state of the art.

In an embodiment of the invention, the at least two pivotal levers in any position are arranged in a common central plane. That promotes easier fitment and reduces the structural space required.

Furthermore, the carrier has at least one guide for displaceably mounting an end of at least one of the at least two pivotal levers, preferably wherein the at least one guide is arranged substantially centrally on the carrier and/or extends substantially over a fifth of the total length of the carrier.

Preferably, the at least one cable pulling device has at least one and preferably precisely one cable which is fixed with an end, preferably with both ends, to the carrier. If only one cable is provided, the structure and assembly of the arrangement is still further simplified.

Also, the at least one cable pulling device can have at least one cable tensioning device with which the tension of a cable of the at least one cable pulling device is adjustable, preferably wherein the at least one cable tensioning device is arranged on the carrier.

Further, the at least one cable pulling device can have at least one deflection device, preferably with a deflection roller, by which a cable of the at least one cable pulling device can be deflected. Preferably, the at least one deflection device is or can be arranged at an end of at least one of the at least two pivotal levers and/or at one of the two guide systems or at the furniture wall.

These measures facilitate fitment of the cable and improve the stability and rigidity of the arrangement.

Particularly preferably, the compensation device in a delivered state of the arrangement is pre-assembled, at least partially, preferably completely, on the carrier. Fitment of the arrangement to a furniture wall is considerably facilitated thereby.

Further, at least one equalization device can elastically displaceably connect one of the at least two pivotal levers to the carrier. Upon adjustment of an inclination of the carrier, the equalization device can compensate for a change, caused by the inclination operation, in the position of the one pivotal lever of the at least two pivotal levers and can thus obviate possible jamming of the pivotal lever mechanism.

Also, the at least one equalization device can include at least one guide element, at least one guide pin, at least one elastic element, preferably a spring, and at least one pivotal lever receiving means. The elastic element however can also be, for example, in any suitable form.

Regarding the method according to the invention, the at least two hingedly interconnected pivotal levers of the at least one pivotal lever mechanism can be transferred between the third and fourth method steps out of a parallel position in which the at least two pivotal levers are arranged substantially parallel to each other into at least one spread position in which the at least two pivotal levers include an angle of greater than 0° relative to each other, preferably wherein at least one cable of the at least one cable pulling device is unwound from a cable supply.

In a further method step, a cable tension of the at least one cable of the at least one cable pulling device can be adjusted.

In addition, in a further method step, a sliding door or folding-sliding door can be mounted to the carrier.

BRIEF DESCRIPTION OF THE INVENTION

Figure 2:
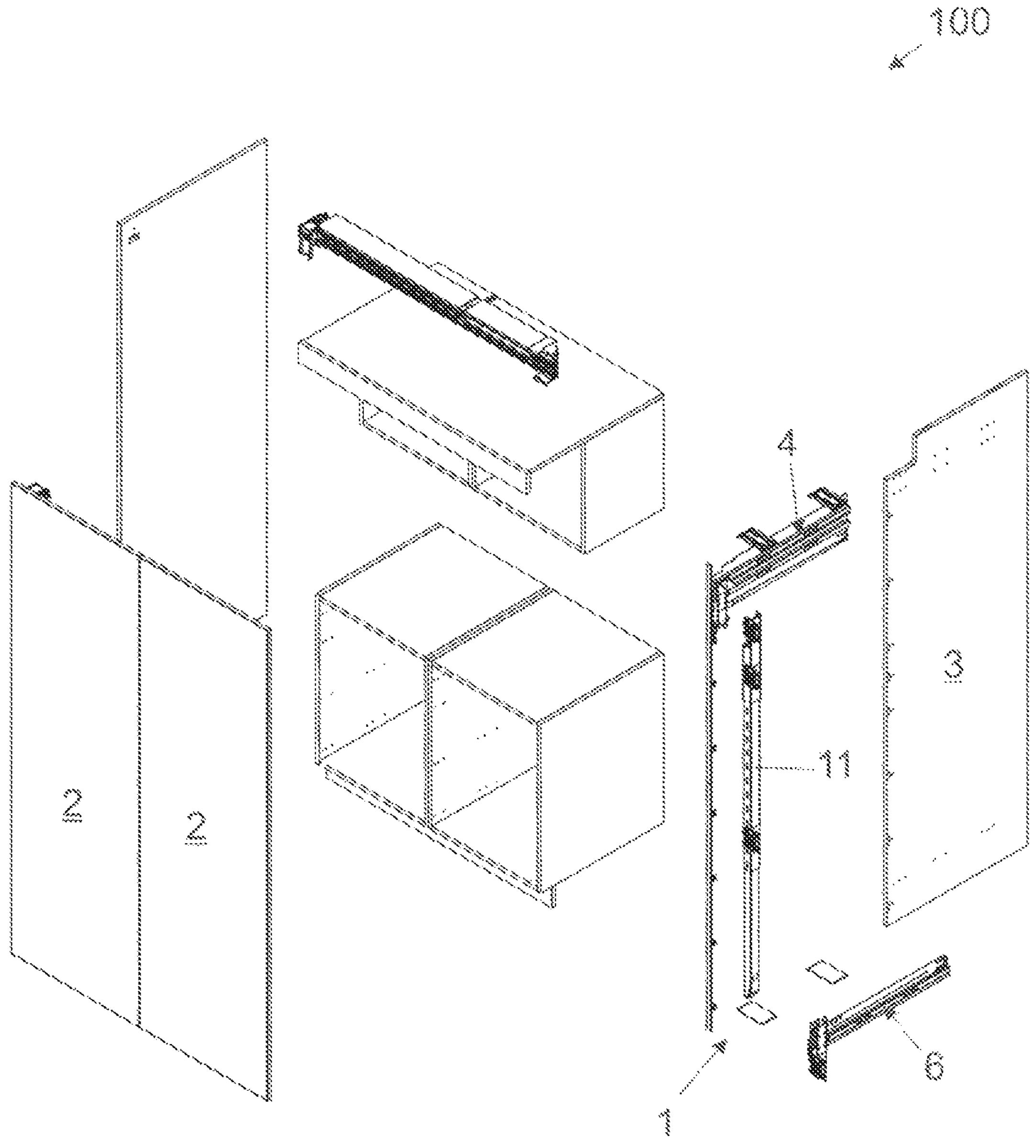
Figure 3:
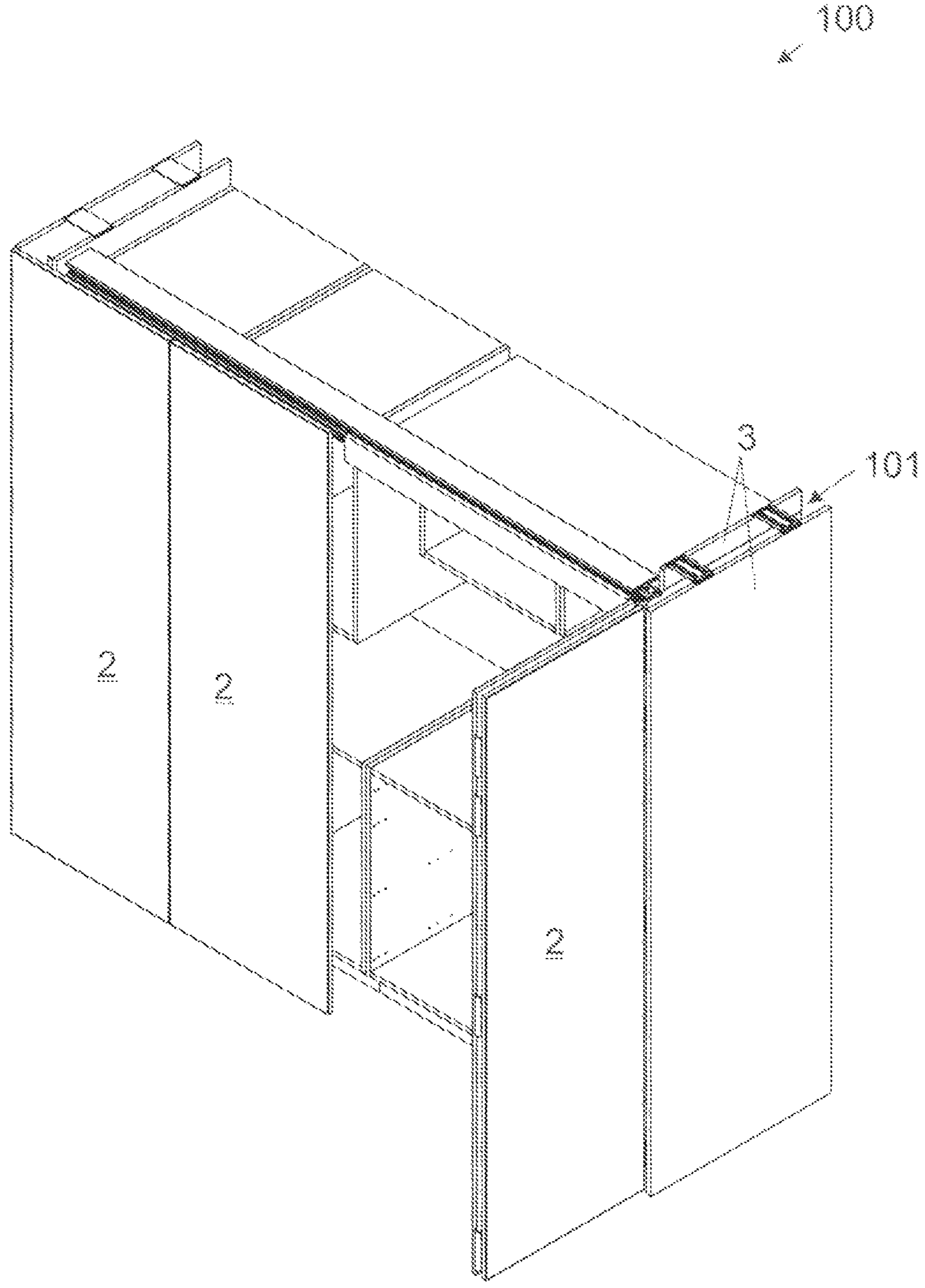
Figure 4:
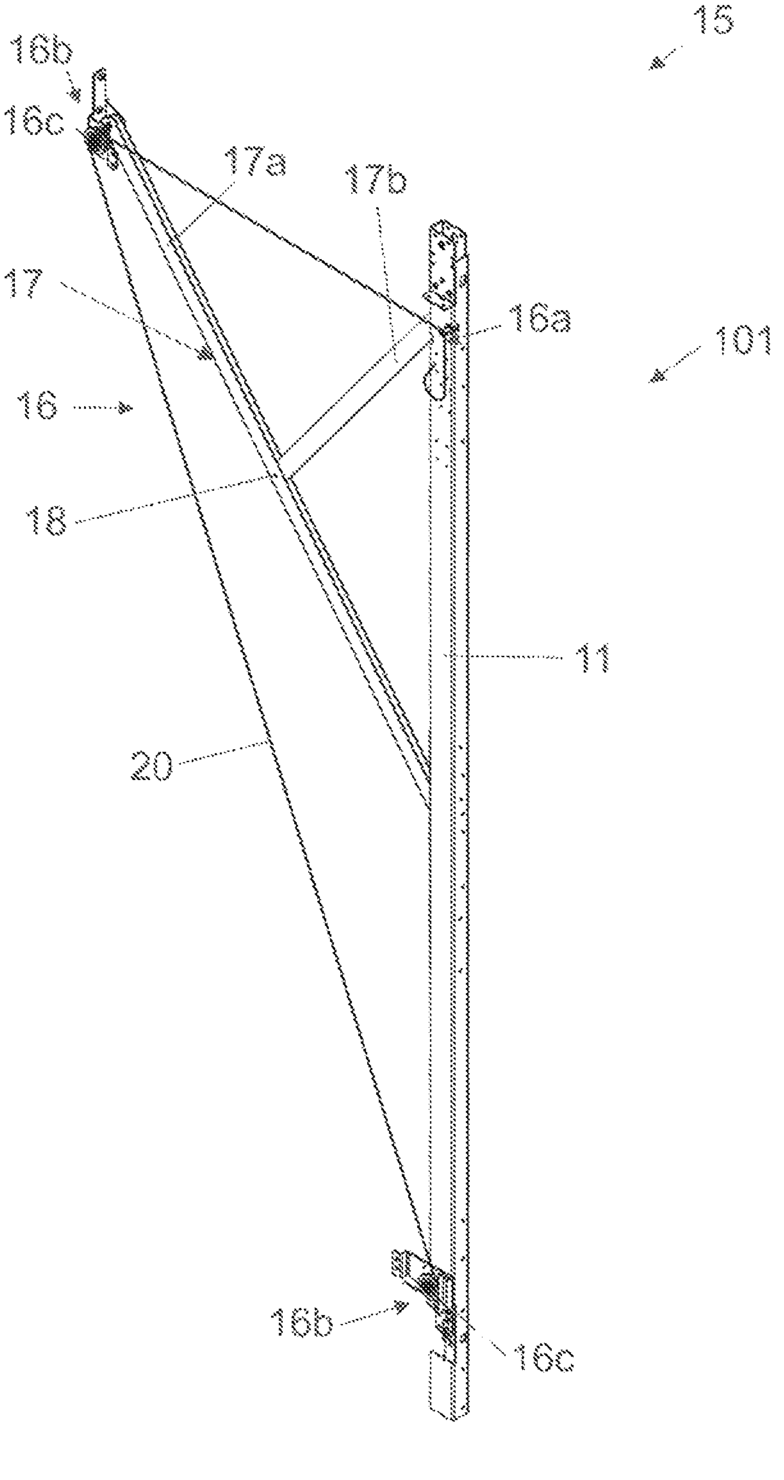
Figure 5A:
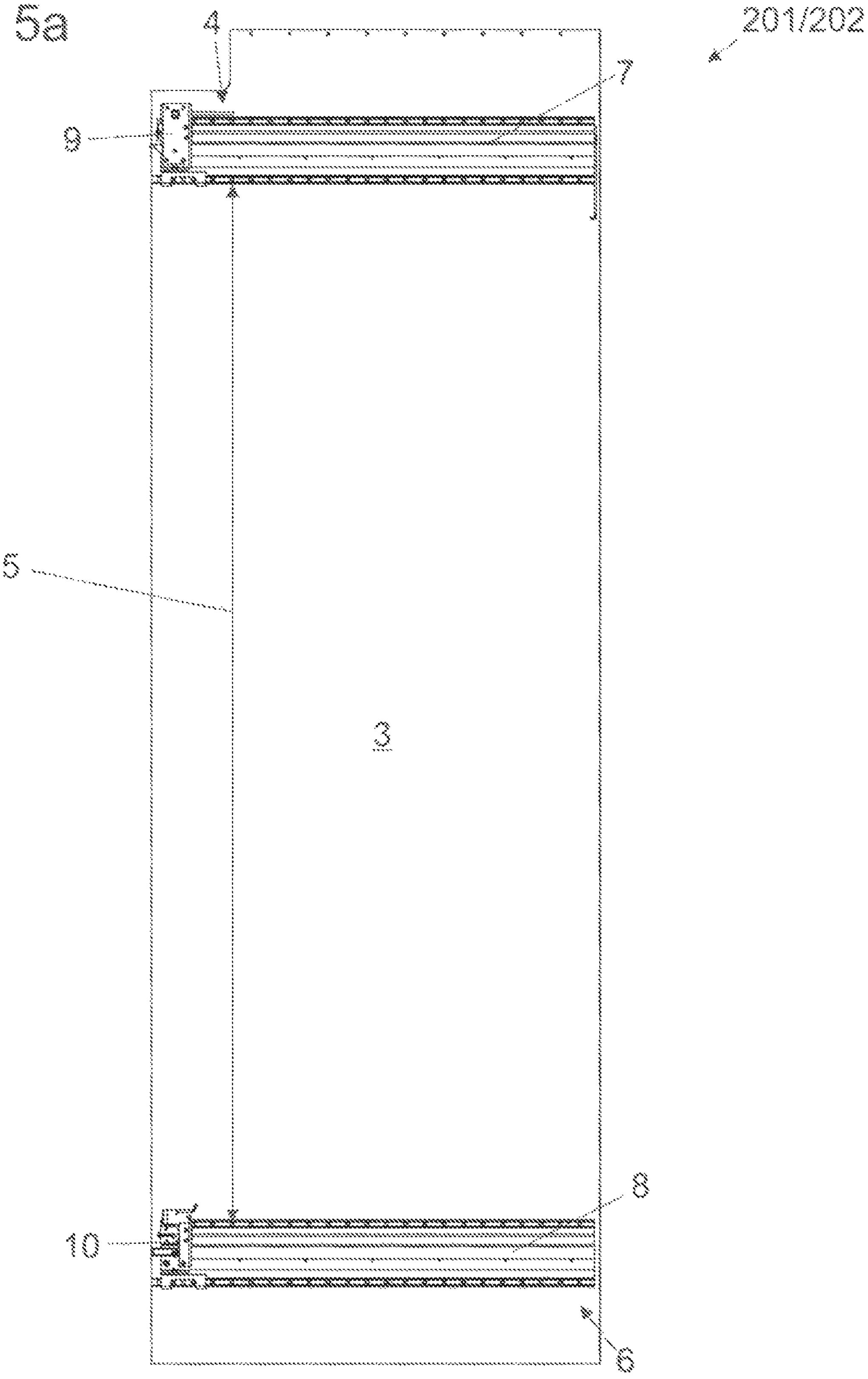
Figure 5B:
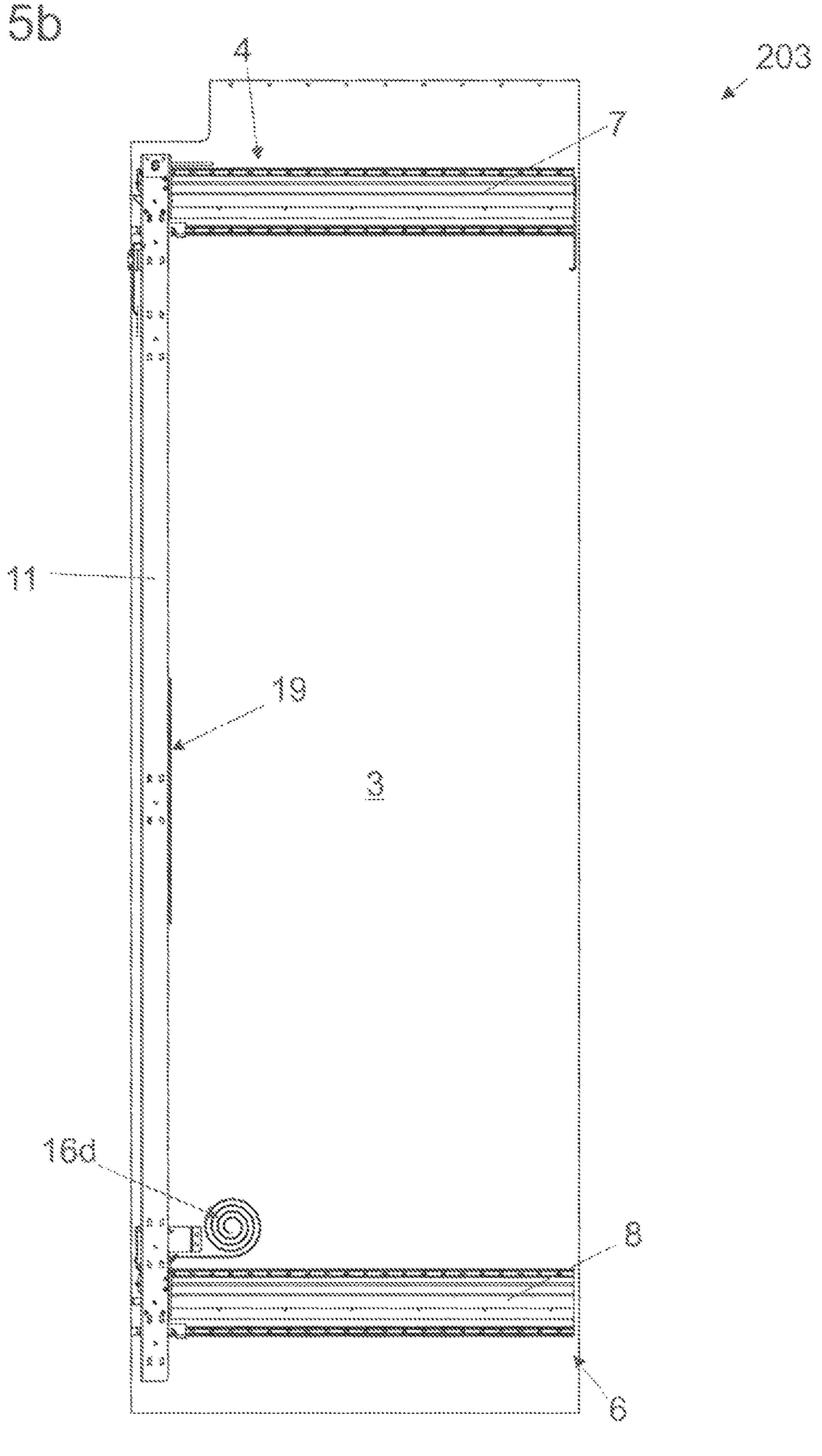
Figure 5C:
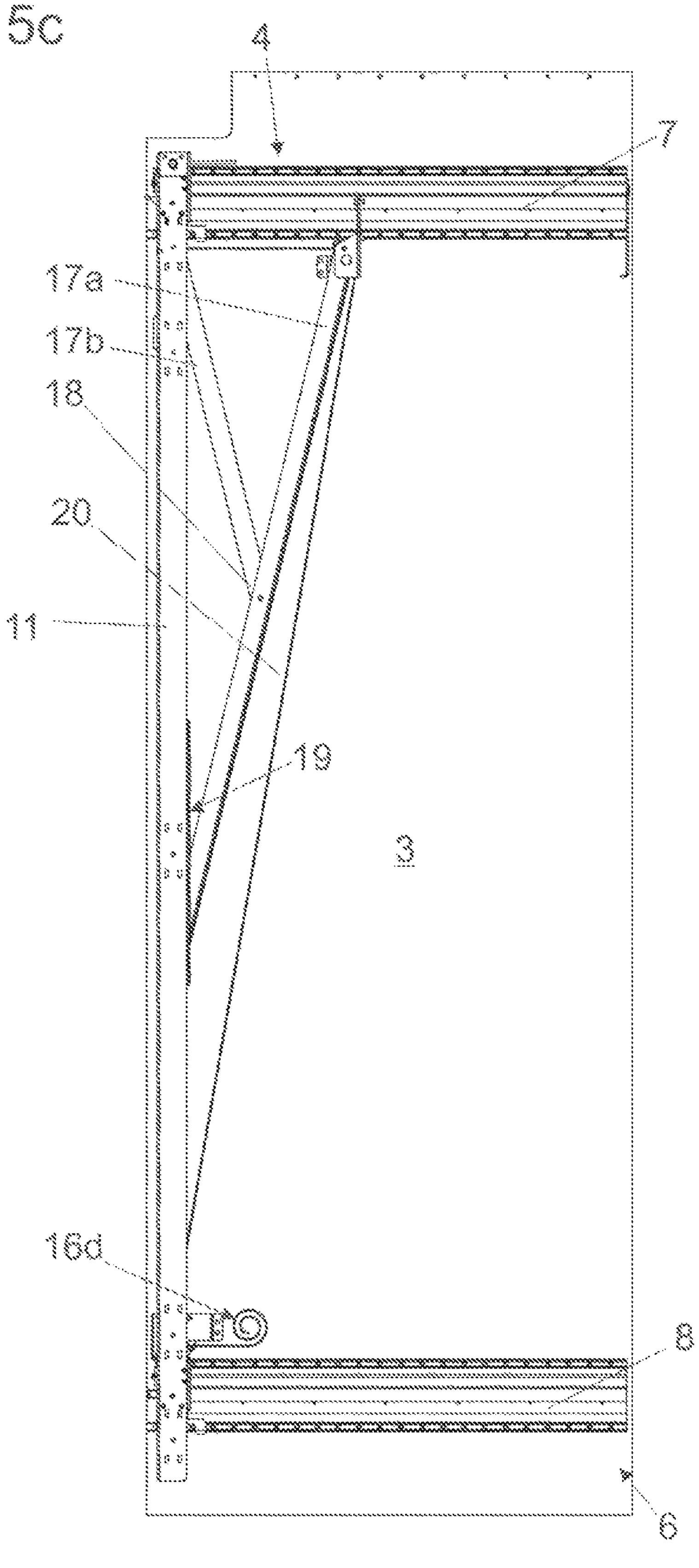
Figure 5D:
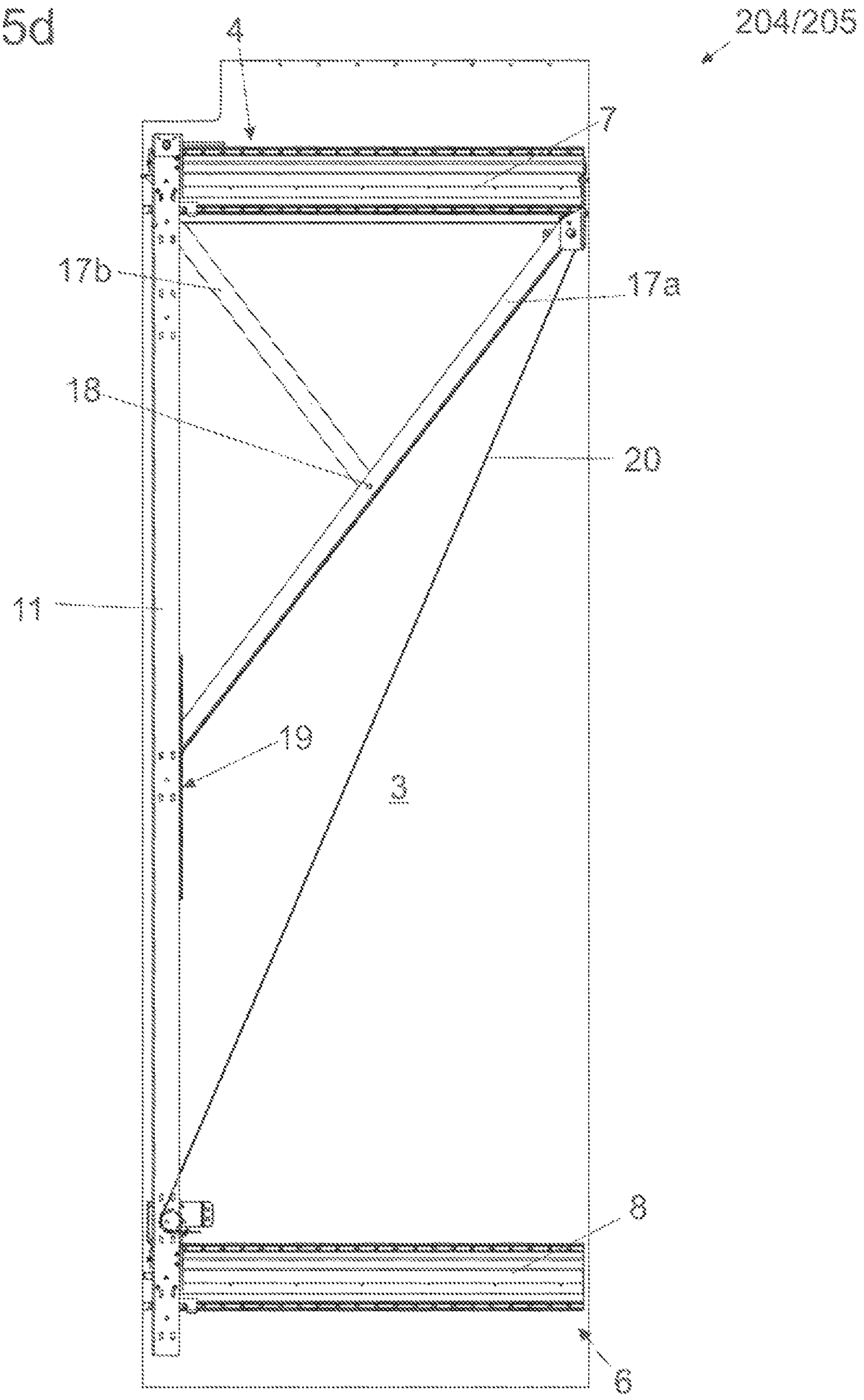
Figure 5E:
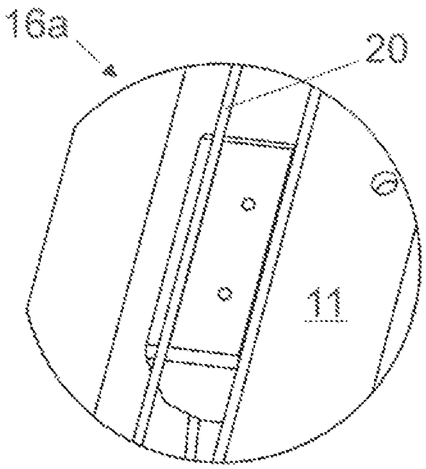
Figure 5F:
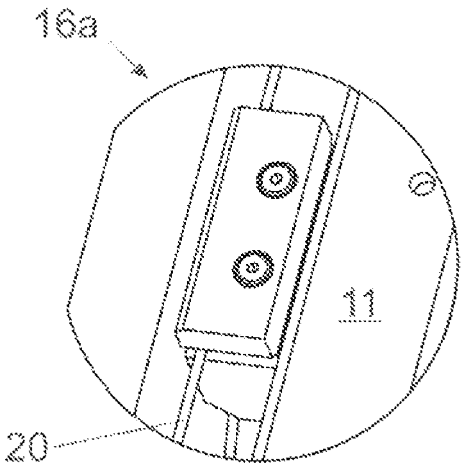
Figure 5G:
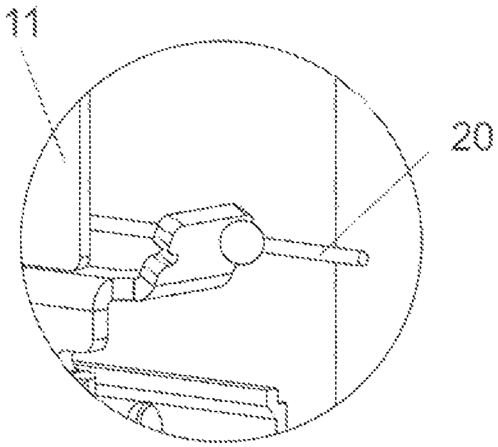
Figure 6A:
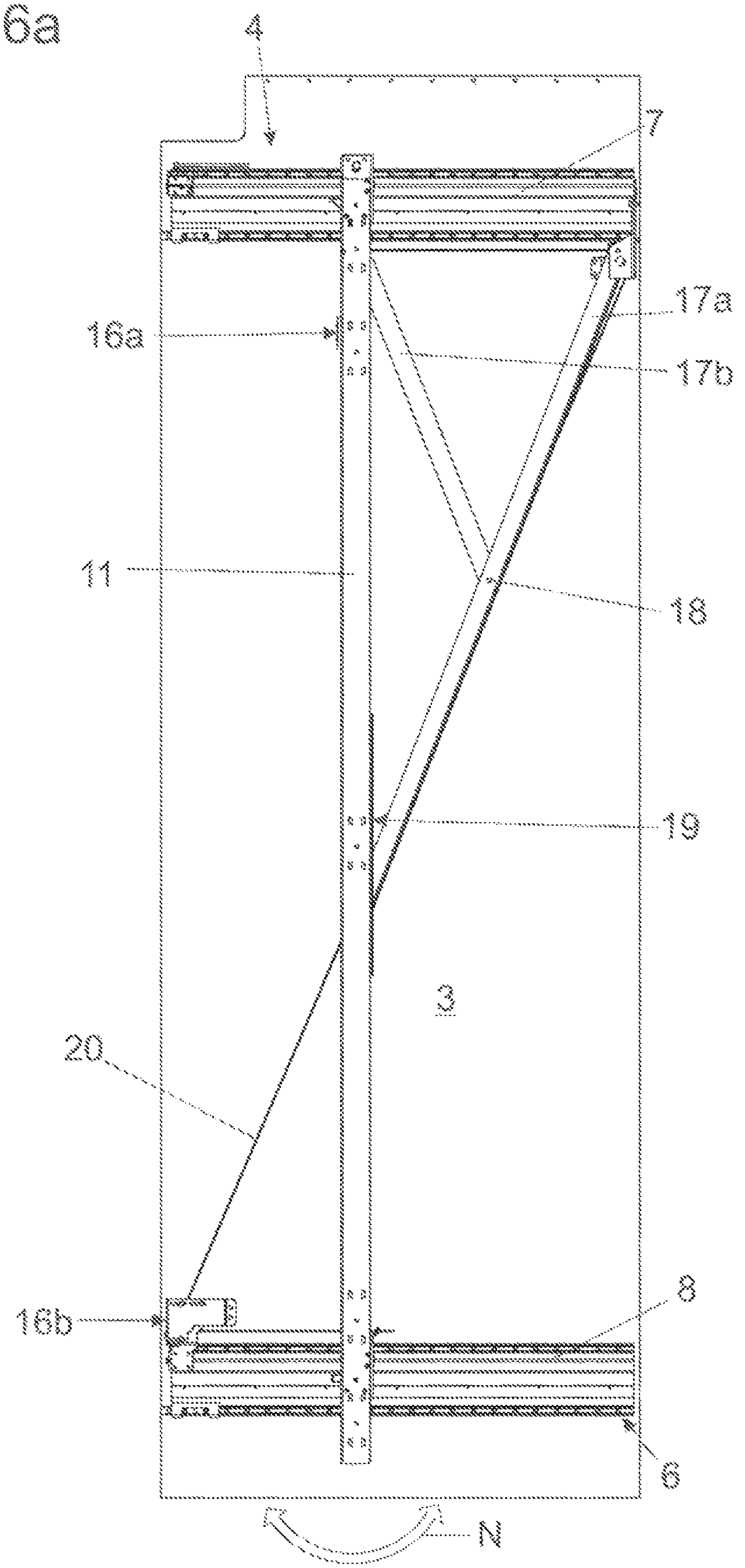
Figure 6B:
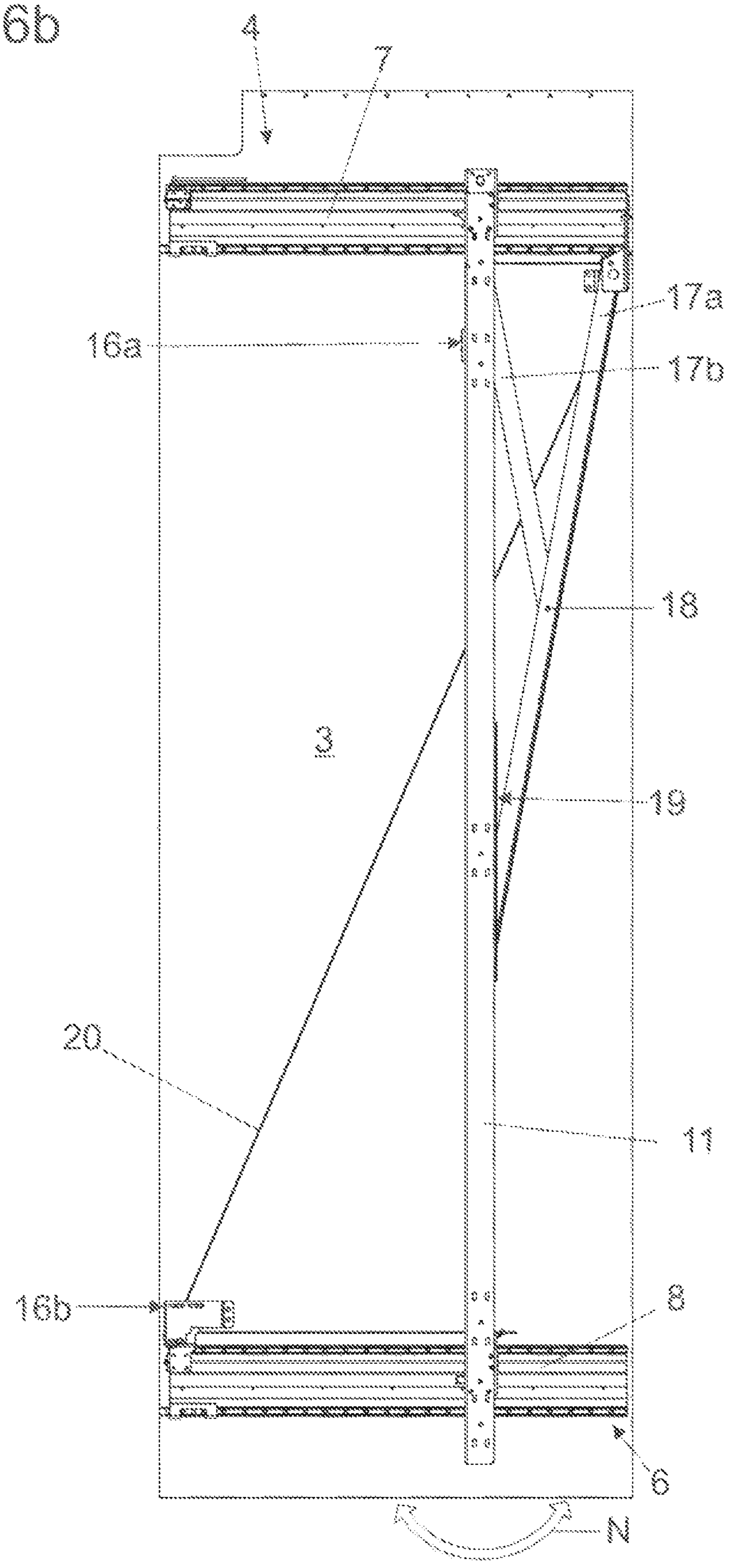
Figure 6C:
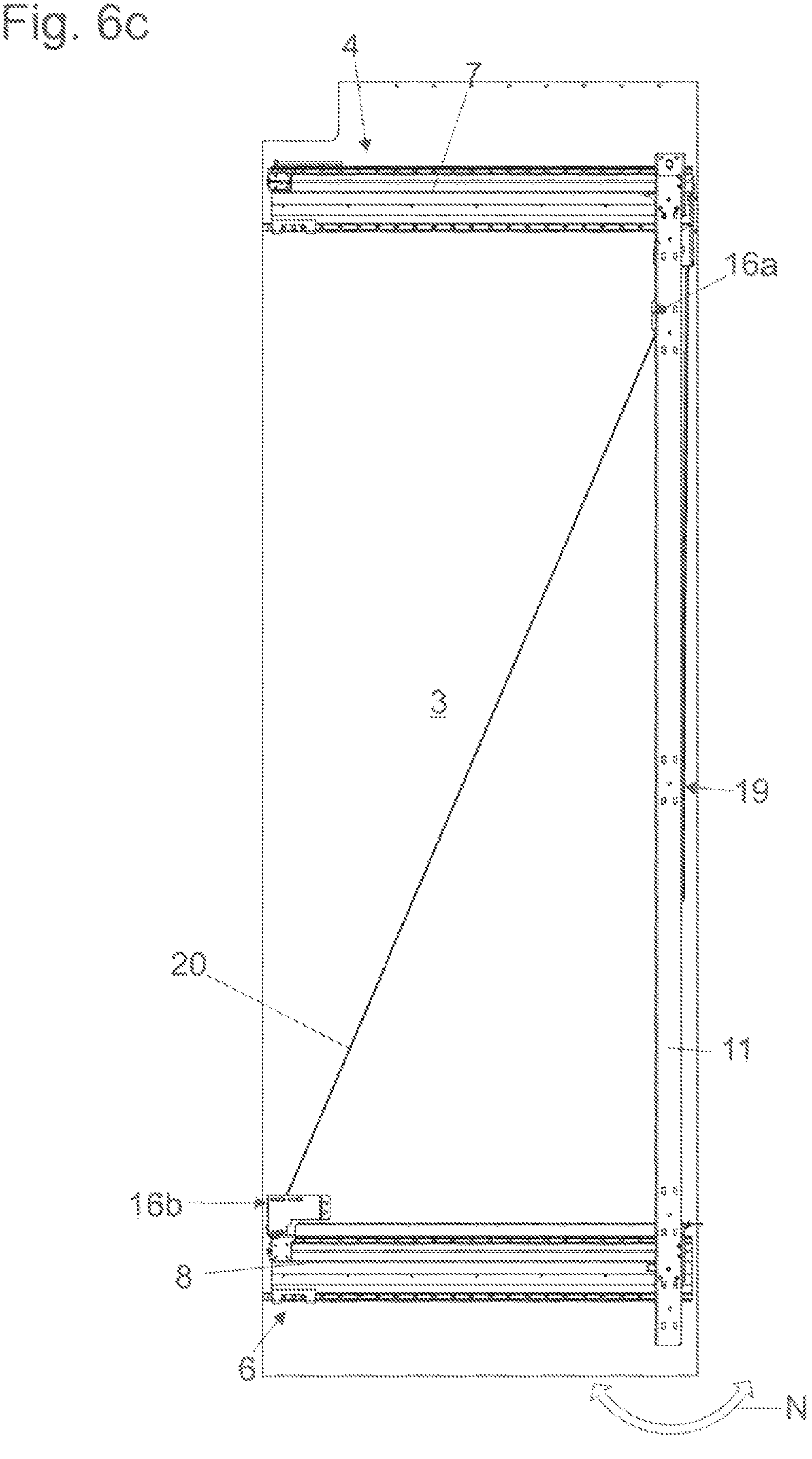
Figure 7A:
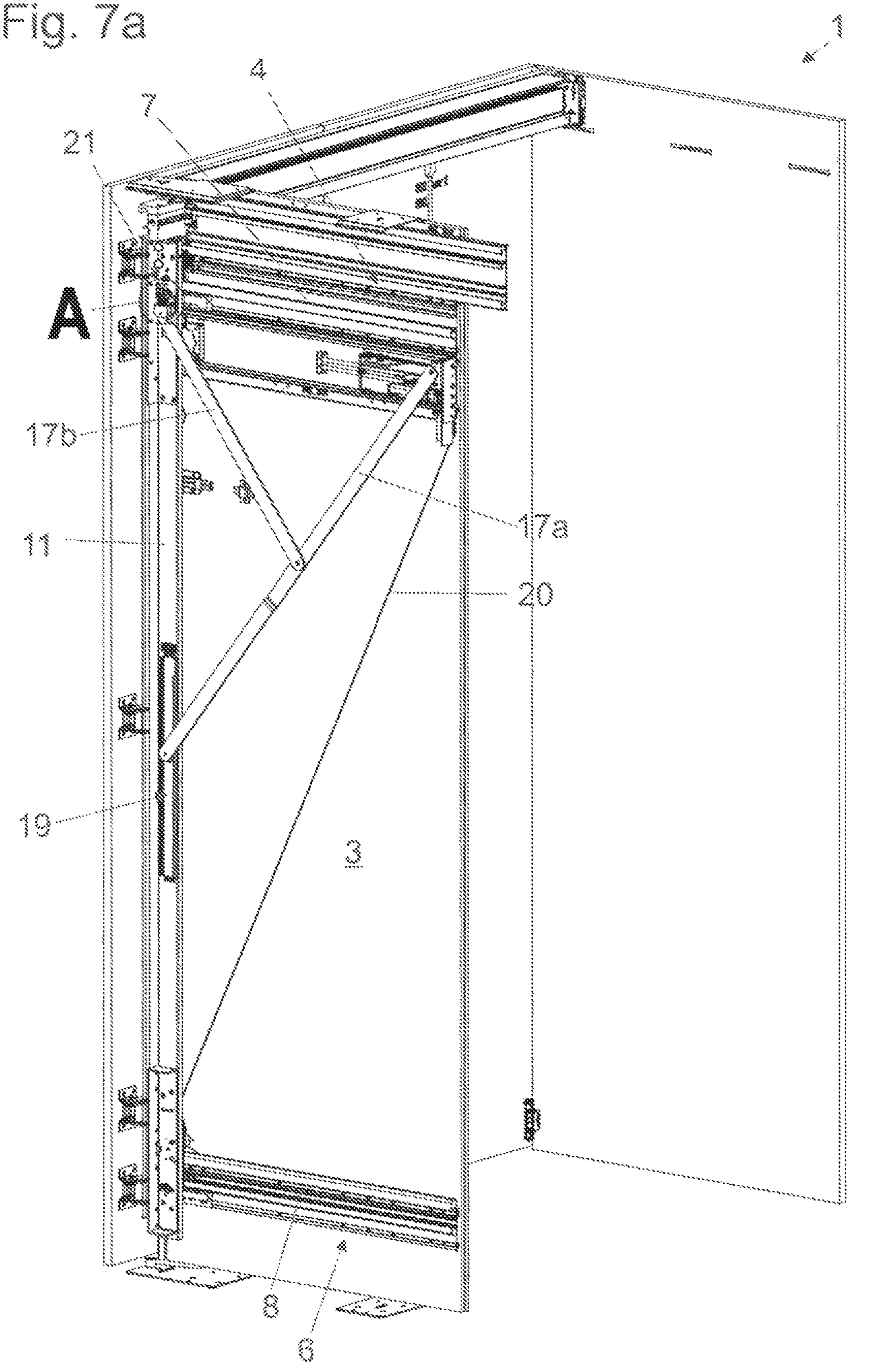
Figure 7B:
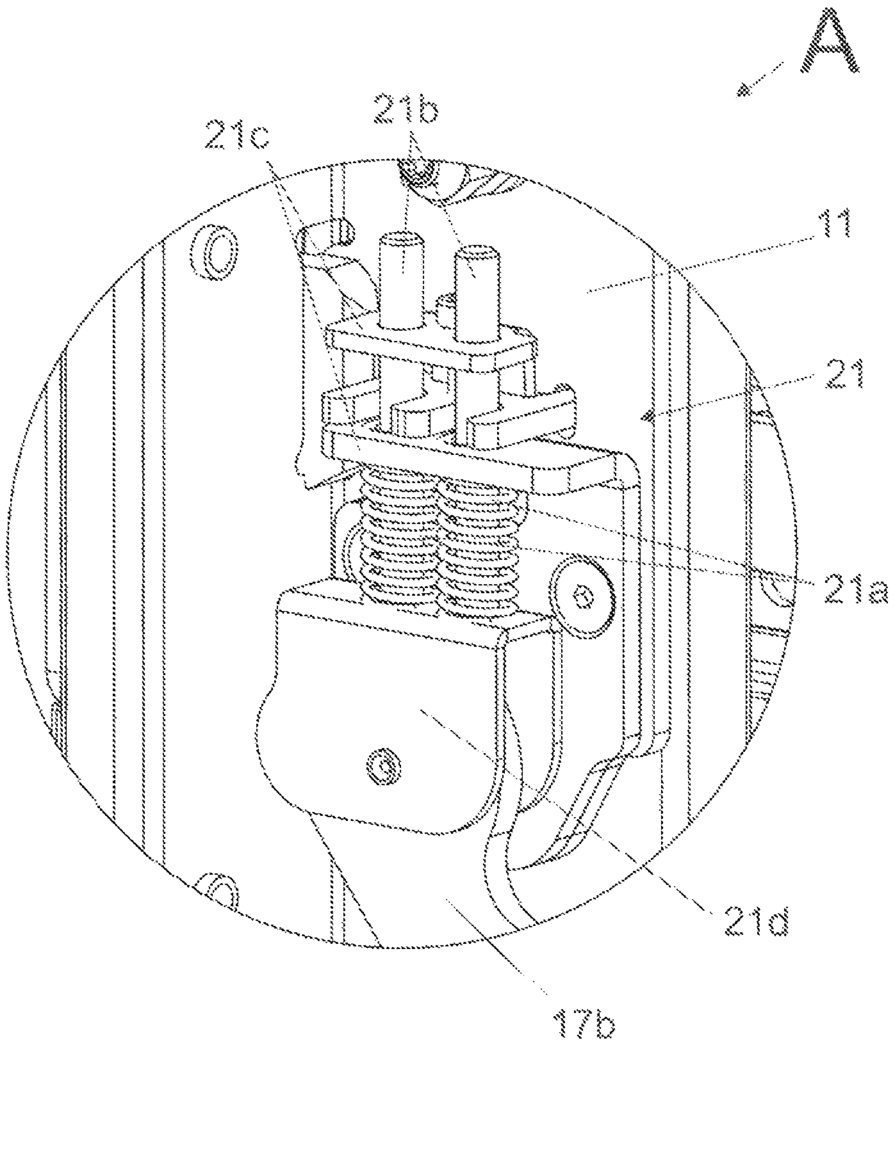
Figure 8:
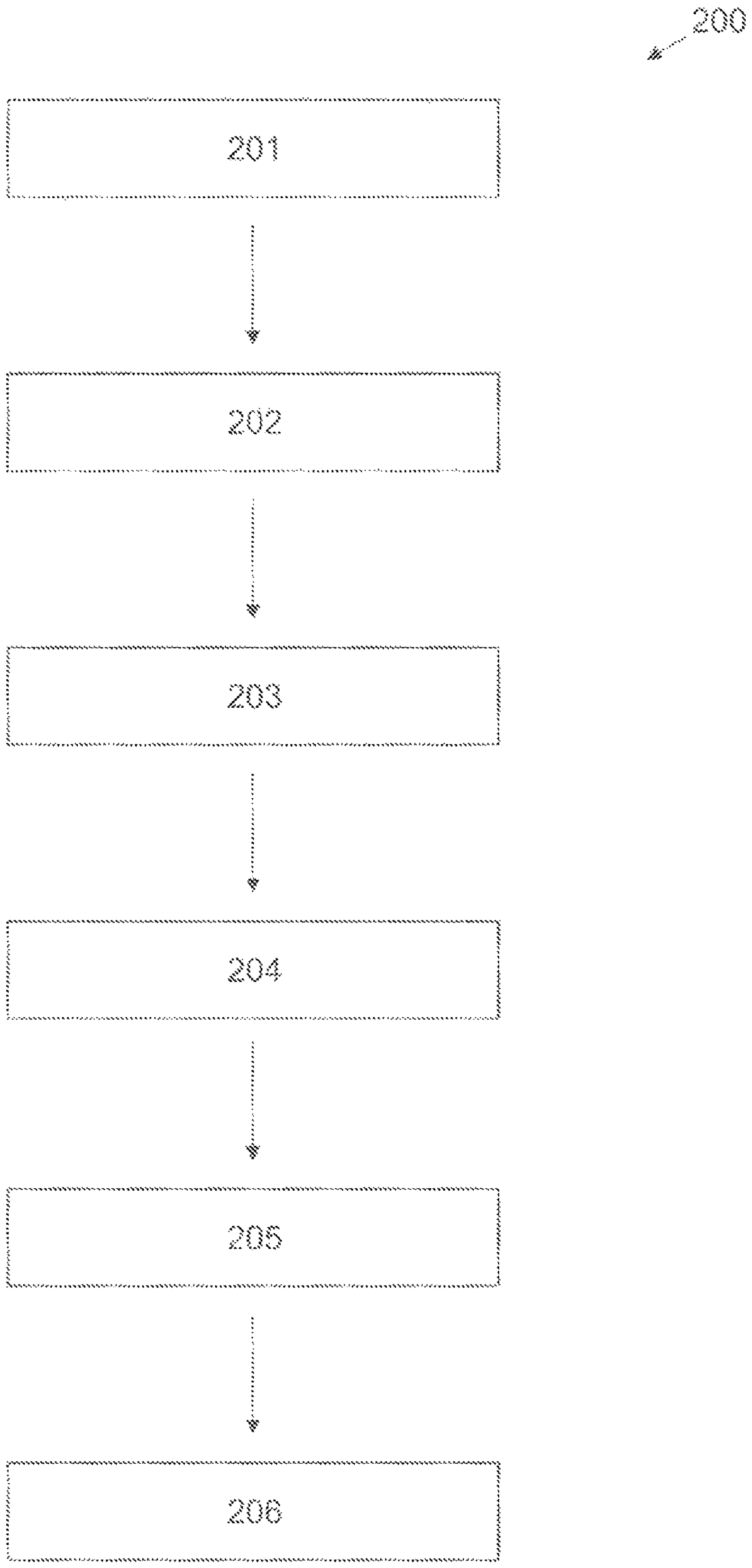

Further details and advantages of the invention will be described more fully hereinafter by means of the specific description with reference to the drawings in which:

FIG. 1 is a perspective view of an article of furniture with an arrangement according to the invention, FIG. 2 is an exploded perspective view of an article of furniture having an arrangement according to the invention, FIG. 3 is a perspective view of a further embodiment of an article of furniture with an arrangement according to the invention, FIG. 4 is a perspective rear view of a compensation device according to the invention, FIG. 5*a* shows first and second steps in a preferred method of mounting an arrangement according to the invention to a furniture wall, FIG. 5*b* shows a third step in a preferred method of mounting an arrangement according to the invention to a furniture wall, FIG. 5*c* shows an intermediate step in a preferred method of mounting an arrangement according to the invention to a furniture wall, FIG. 5*d* shows a fourth and a fifth step in a preferred method of mounting an arrangement according to the invention to a furniture wall, FIG. 5*e* is a perspective view of a cable tensioning device prior to tensioning of a cable, FIG. 5*f* is a perspective view of a cable tensioning device after tensioning of a cable, FIG. 5*g* is a perspective view of a fixing location of a cable, FIG. 6*a* shows an arrangement according to the invention in a first position, FIG. 6*b* shows an arrangement according to the invention in a second position, FIG. 6*c* shows an arrangement according to the invention in a third position, FIG. 7*a* is a perspective view of a further embodiment of an arrangement according to the invention, FIG. 7*b* shows the detail A in FIG. 7*a*, and FIG. 8 shows a flow chart of a method according to the invention of mounting an arrangement.

DETAILED DESCRIPTION OF THE INVENTION

FIG. 1*a* diagrammatically shows a perspective view of an article of furniture 100 which can include different component parts, for example a plurality of compartments in the interior of the article of furniture 100.

Provided laterally of the article of furniture 100 is a hollow space 101 formed from two mutually spaced furniture walls 3. A folding-sliding door 2 can be moved into that hollow space 101 in the state of being folded together. When the folding-sliding door 2 is spread open it conceals the interior of the article of furniture 100.

The folding-sliding door 2 is composed of two door leaves which are folded together in the position shown in FIG. 1. From that folded-together position the folding-sliding doors 2 can be transferred into a spread-open position in which the flap portions include an angle greater than 0°.

Arranged adjoining the hollow space 101 is a further part of the article of furniture 100, for example a cupboard. When the folding-sliding door 2 is in a spread position and the further part of the article of furniture 100 is closed then the folding-sliding door 2 and the further part of the article of furniture 100 form a continuous front to the article of furniture.

FIG. 2 shows an exploded perspective view of an article of furniture 100 with an arrangement 1 according to the invention. The second furniture wall 3 of the hollow space 101 is not shown for better clarity of the drawing. It will be seen that the folding-sliding door 2 is in a completely spread-open condition. It is also possible to see a first guide system 4 and a second guide system 6 and a furniture wall 3. It is also possible to see a carrier 11.

FIG. 3 shows a perspective view of a further embodiment of an article of furniture 100 with an arrangement 1 according to the invention. Accordingly there can also be provided a multiplicity of folding-sliding doors 2 on an article of furniture 100. Such an article of furniture 100 can also include for example a kitchen which can be concealed by the folding-sliding doors 2. Basically an arrangement 1 according to the invention can be provided on all suitable articles of furniture, in particular articles of furniture which include at least one sliding or folding-sliding door.

FIG. 4 shows a perspective view of a compensation device 15 according to the invention. It can be seen that the compensation device 15 is composed of a cable pulling device 16 and a pivotal lever mechanism 17.

The cable pulling device 16 in this case includes a cable 20, two deflection devices 16*b* each having a deflection roller 16*c*, a cable tensioning device 16*a* and a cable supply 16*d* (not shown).

The pivotal lever mechanism 17 includes two pivotal levers 17*a*, 17*b*, a second pivotal lever 17*b* being arranged with a first end in the center of the first pivotal lever 17*a* and with a second end on a carrier 11. The first pivotal lever 17*a* is connected at a first end to the guide 19 (not visible) of the carrier 11 while the second end in an installed state is connected to a first guide system 6 and/or a furniture wall 3.

A first deflection device 16*b* is arranged in a region at the lower end of the carrier 11 at the second guide device 6 or the furniture wall 3. The cable 20 extends therefrom to the second deflection device 16*b* which is arranged in the region of the second end of the first pivotal lever 17*a* at the second end of the first pivotal lever 17*a* or at the first guide device 4 or at the furniture wall 3. The cable 20 is arranged at a first end in the region of the first deflection device 16*b* on the carrier 11 or a second guide body 10. A second end of the cable 20 is fixed in an upper region of the carrier to the carrier 11 or a first guide body 9 and can be tensioned by way of the cable tensioning device 16*a*.

FIG. 5*a* shows a first step 201 and a second step 202 in a preferred method 200 of mounting an arrangement 1 according to the invention to a furniture wall 3. In a first step 201 a first guide system 4 including a guide 7 and a guide body 9 mounted displaceably on the guide 7 is fixed to the furniture wall 3.

In a second step 202 a second guide system 6 including a guide 8 and a guide body 10 mounted displaceably on the guide 8 is fixed to the furniture wall 3 spaced at a vertical spacing 5 from the first guide system 4.

Fixing of the guide systems 6, 7 to the furniture wall 3 is preferably effected by screwing but all other suitable methods are also conceivable.

FIG. 5*b* shows a third step 203 in a preferred method 200 of mounting an arrangement 1 according to the invention to a furniture wall 3. In a third step 203 in the method 200 the carrier 11 is connected to the guide bodies 9, 10. The carrier 11 is thus mounted displaceably to the guide systems 4, 6 and couples the guide bodies 9 and 10 together.

It can be seen that the carrier 11 centrally has a guide 19 for displaceably mounting an end of at least one of the at least two pivotal levers 17*a*, 17*b*. The pre-assembled pivotal lever mechanism 17 is arranged within the carrier 11. The cable pulling device 16 is also already pre-assembled to the carrier 11. It is basically however also possible for no parts of the arrangement 1 to be pre-assembled.

In the course of the third method step 203 a first deflection device 16*b* which includes the cable supply 16*d* is also mounted to the furniture wall 3 and/or to the second guide system 6.

FIG. 5*c* shows an intermediate step in a preferred method 200 of mounting an arrangement 1 according to the invention to a furniture wall 3. In this intermediate step the pivotal lever mechanism 17 is transferred out of the interior of the carrier 11 and into a spread position. It can be seen that the pre-fitted cable 20 also moves with the pivotal levers 17*a*, 17*b* by way of the deflection devices 16*b*. As a result cable 20 is taken from the cable supply 16*d*.

FIG. 5*d* shows a fourth step 204 and a fifth step 205 in a preferred method 200 of mounting an arrangement 1 according to the invention to a side wall 3. In a fourth step 204 the pivotal lever mechanism 17 is completely pivoted out and fixed to the first guide 7 by way of an end of the first pivotal lever 17*a*. The cable 20 in the course thereof is completely removed from the cable supply 16*d*.

In a fifth step 205 the cable 20 is tensioned by way of a cable tensioning device 16*a* (not visible) to ensure the best possible stability and rigidity for the arrangement 1.

A sixth method step 206 is not shown, in the course of which a sliding door or folding-sliding door 2 is mounted to the carrier 11.

FIGS. 5*e* and 5*f* show the cable tensioning device 16*a* before (FIG. 5*e*) and after (FIG. 5*f*) tensioning of the cable 20. In that case the cable 20 is pulled manually and clamped by way of the cable tensioning device 16*a* and is thus held in respect of pulling thereon and under tension.

FIG. 5*g* shows the fixing of the first end of the cable 20. Provided at the first end of the cable 20 is an abutment sleeve which is introduced into a corresponding receiving means.

FIGS. 6*a* through 6*c* show the arrangement 1 according to the invention in the finished mounted state in a plurality of positions of the carrier 11 and the sliding or folding-sliding door 2. It will be seen that the carrier 11 and therewith the sliding or folding-sliding door 2 is secured against tilting by the arrangement 1 according to the invention in any position.

When the carrier 11 is in a position at the left, that is to say in a position in which the sliding or folding-sliding door 2 is completely extended from the hollow space 101 then the carrier 11 or the sliding or folding-sliding door 2 is supported primarily by the pivotal lever mechanism 17. In that situation the second pivotal lever 17*b* is subjected to a tensile loading and the first pivotal lever 17*a* is subjected to a pressure loading.

When the carrier 11 is in a position in the center (FIGS. 6*a*, 6*b*) of the furniture wall 3, that is to say in a position in which the sliding or folding-sliding door 2 is not completely out of or in the hollow space 101 then the carrier 11 or the sliding or folding-sliding door 2 is supported both by the pivotal lever mechanism 17 and also by the cable pulling device 16. In that case once again the second pivotal lever 17*b* is subjected to a tensile loading and the first pivotal lever 17*a* is subjected to a pressure loading. In addition the cable 20 carries tensile forces by way of its first end in the lower region of the carrier 11.

Depending on the position of the carrier 11 or the sliding or folding-sliding door 2 they are supported more by the pivotal lever mechanism 17 or by the cable pulling device 16.

When the carrier 11 is in a position to the right (FIG. 6*c*), that is to say in a position in which the sliding or folding-sliding door 2 is completely retracted into the hollow space 101 then the carrier 11 or the sliding or folding-sliding door 2 is supported primarily by the cable pulling device 16.

FIG. 7*a* shows a perspective view of a further embodiment of an arrangement according to the invention. It can be seen that the second pivotal lever 17*b* is arranged on the carrier 11 by way of an equalization device 21.

The detail A of FIG. 7*a*, that is shown in FIG. 7*b*, shows the equalization device 21. The equalization device 21 includes a pivotal lever receiving means 21*d* in which the second pivotal lever 17*b* is rotatably mounted. In addition there are guide pins 21*b* arranged on the pivotal lever receiving means 21*d* together with elastic elements 21*a* in the form of compression springs. In this structure the guide pins 21*b* are guided in guide elements 21*c* which are arranged on the carrier 11, with the compression springs being operative between a guide element 21*c* and the pivotal lever receiving means 21*d*.

The second pivotal lever 17*b* is thus arranged on the carrier 11 elastically displaceably by way of the equalization device 21. If the inclination of the carrier 11 is adjusted corresponding to the arrow N (FIGS. 6*a* through 6*c*) the equalization device 21 equalizes a change, caused by the inclination process, in the position of the second pivotal lever relative to the carrier 11 and thus prevents possible jamming of the pivotal lever mechanism 17.

FIG. 8 shows a flow chart of a preferred method 200 of mounting an arrangement 1 according to the invention to a furniture wall 3. The sequence of method steps 201 through 206 of the method 200 can be seen.

LIST OF REFERENCES

1 arrangement
2 sliding door or folding-sliding door
3 furniture wall
4 first guide system
5 vertical spacing between guide systems
6 second guide system
7 guide
8 guide
9 guide body
10 guide body
11 carrier
12 tilting moment
13 tilt axis
14 restoring moment
15 compensation device
16 cable pulling device
16*a* cable tensioning device
16*b* deflection device
16*c* deflection roller
16*d* cable supply
17 pivotal lever mechanism
17*a* pivotal lever
17*b* pivotal lever
18 hinge point
19 guide
20 cable
21 equalization device
21*a* elastic element
21*b* guide pins
21*c* guide elements
21*d* pivotal lever receiving means
100 article of furniture
101 hollow space
200 method
201 first method step
202 second method step
203 third method step
204 fourth method step
205 fifth method step
206 sixth method step

The invention claimed is:

1. An arrangement for guiding a sliding door or folding-sliding door on a furniture wall, comprising:

a first guide system to be fixed to the furniture wall and at least one second guide system to be fixed to the furniture wall at a vertical spacing from the first guide system, wherein the two guide systems each have at least one guide and a guide body mounted displaceably to the guide, a carrier to which the sliding door or folding-sliding door is to be fixed and which is or can be connected to the two guide bodies of the guide systems in motionally coupled relationship, and a compensation device for compensating a tilting moment of the carrier or the sliding door or folding-sliding door mounted thereto about a tilt axis by a restoring moment, wherein the compensation device includes at least one cable pulling device, wherein the compensation device in addition to the at least one cable pulling device has at least one pivotal lever mechanism, wherein the at least one pivotal lever mechanism includes at least two hingedly interconnected pivotal levers which are pivotable relative to each other upon a movement of the carrier by means of the two guide systems along the furniture wall.

2. The arrangement as set forth in claim 1, wherein the at least two pivotal levers are pivotable relative to each other in such a way that they include an angle of between 0° and 85° relative to each other.

3. The arrangement as set forth in claim 1, wherein the at least one pivotal level mechanism can be pivoted between a parallel position in which the at least two pivotal levers are arranged substantially parallel to each other and at least one spread position in which the at least two pivotal levers include an angle greater than 0° relative to each other, wherein the at least two pivotal levers in the at least one spread position form substantially a Y-shape.

4. The arrangement as set forth in claim 1, wherein the at least two pivotal levers in any position are arranged in a common central plane.

5. The arrangement as set forth in claim 1, wherein:

at least one of the at least two pivotal levers is or can be connected with a first end to the carrier and with a second end to one of the two guide systems and/or to the furniture wall, at least one of the at least two pivotal levers is connected with a first end to the carrier and with a second end to the other of the at least two pivotal levers, and/or at least one of the at least two pivotal levers has a substantially centrally arranged hinge point at which the other of the at least two pivotal levers is hingedly arranged.

6. The arrangement as set forth in claim 1, wherein the carrier has at least one guide for displaceably mounting an end of at least one of the at least two pivotal levers, wherein the at least one guide is arranged substantially centrally on the carrier and/or extends substantially over a fifth of the total length of the carrier.

7. The arrangement as set forth in claim 1, wherein the at least one cable pulling device has at least one cable which is fixed with an end, or with both ends, to the carrier.

8. The arrangement as set forth in claim 1, wherein the at least one cable pulling device has at least one cable tensioning device with which the tension of a cable of the at least one cable pulling device is adjustable, wherein the at least one cable tensioning device is arranged on the carrier.

9. The arrangement as set forth in claim 1, wherein the at least one cable pulling device has at least one deflection device, with a deflection roller, by which a cable of the at least one cable pulling device can be deflected, preferably wherein the at least one deflection device is or can be arranged at an end of at least one of the at least two pivotal levers and/or at one of the two guide systems or at the furniture wall.

10. The arrangement as set forth in claim 1, wherein the compensation device in a delivered state of the arrangement is pre-assembled, at least partially, or completely, on the carrier.

11. The arrangement as set forth in claim 1, wherein there is provided at least one equalization device, by means of which one of the at least two pivotal levers is or can be elastically displaceably connected to the carrier.

12. The arrangement as set forth in claim 11, wherein the at least one equalization device includes at least one guide element, at least one guide pin, at least one elastic element, comprising a spring, and at least one pivotal lever receiving means.

13. The arrangement as set forth in claim 12, wherein the elastic element is arranged between the at least one guide element and the at least one pivotal lever receiving means.

14. An article of furniture comprising at least one furniture wall, at least one sliding door or folding-sliding door and at least one arrangement as set forth in one of the preceding claims for guiding the at least one sliding door or folding-sliding door at the at least one furniture wall, wherein the at least one furniture wall at least partially defines a shaft-shaped hollow space in the article of furniture, in which the at least one sliding door or folding-sliding door is arranged.

15. A method of mounting an arrangement as set forth in claim 1 to a furniture wall, wherein in a first method step the first guide system or the second guide system is fixed to the furniture wall, in a second method step the other guide system is fixed to the furniture wall at a vertical spacing relative to the guide system fixed to the furniture wall in the course of the first method step, in a third method step the carrier is connected in motionally coupled relationship to the two guide bodies of the guide systems, and in a fourth method step at least one of the at least two pivotal levers is connected to one of the two guide systems and/or to the furniture wall.

16. The method as set forth in claim 15, wherein the at least two hingedly interconnected pivotal levers of the at least one pivotal lever mechanism are transferred between the third and fourth method steps out of a parallel position in which the at least two pivotal levers are arranged substantially parallel to each other into at least one spread position in which the at least two pivotal levers include an angle of greater than 0° relative to each other, wherein at least one cable of the at least one cable pulling device is unwound from a cable supply.

17. The method as set forth in claim 16, wherein in a further method step a cable tension of the at least one cable of the at least one cable pulling device is adjusted.

18. The method as set forth in claim 15, wherein in a further method step a sliding door or folding-sliding door is mounted to the carrier.

* * * * *